United States Patent Office 3,551,566
Patented Dec. 29, 1970

3,551,566
FISH DISEASE TREATING COMPOSITION AND METHOD OF USING SAME
Masanao Shimizu, Kobe-shi, Yoshiyuki Takase, Amagasaki-shi, and Saburoh S. Kubota, Tsu-shi, Japan, assignors to Dainippon Pharmaceutical Co., Ltd., Osaka-shi, Japan
No Drawing. Filed Sept. 27, 1967, Ser. No. 671,131
Int. Cl. A61k 27/00
U.S. Cl. 424—263    9 Claims

ABSTRACT OF THE DISCLOSURE

A method for preventing and treating infectious diseases of fish caused by pathogenic microorganisms which comprises applying as an active ingredient 2-[2-5-nitro-2-furyl)vinyl]-6-hydroxymethylpyridine to fish.

---

The present invention relates to a prophylactic and therapeutic agent against fish diseases. More particularly, it relates to the use of 2-[2 - (5-nitro-2-furyl)-vinyl]-6-hydroxymethylpyridine as a prophylactic and therapeutic agent against infectious diseases of fish.

The term "fish" herein used has a very wide sense covering various non-mammalian aquatic animals which may be kept, raised or cultured as food or pets and particularly includes fish in an ordinary meaning and shellfish.

The said 2-[2-(5-nitro-2-furyl)vinyl]-6-hydroxymethylpyridine is representable by the formula:

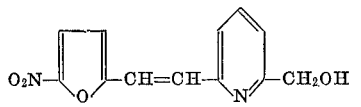

[I]

and will be hereinafter referred to as "nitrofuran [I]."

Hitherto, there have been used some chemotherapeutic agents for treatment of infectious diseases of fish, due to their corroborated effectiveness in diseases of terrestrial mammals. Examples of such chemotherapeutic agents are furazolidone, chloroamphenicol, tetracycline, sulfisoxazole, etc. The microorganisms causing diseases of fish are, however, not exactly the same as those of terrestrial mammals. Moreover, the ecological and physiological behavior of fish are much different from those of terrestrial mammals. Therefore, the unerring effectiveness of the chemotherapeutic agents of various pathogenic microganisms of fish is dubious.

It has now been unexpectedly found that the nitrofuran [I] exhibits a high anti-microbial activity against a variety of microorganisms causing infectious diseases in fish in vitro and in vivo. It has also been found that the nitrofuran [I] is less toxic and shows no material toxicity to fish at an ordinary dose. It has further been found that the continuous application of the nitrofuran [I] for a long duration produces tolerances in pathogenic microorganisms of fish with much difficulty. As well known, a number of nitrofuran compounds are highly active in controlling the growth of pathogenic microorganisms for terrestrial mammals. But, such high activity is usually only in vitro. Most of them do not exert any remarkable activity in vivo. This inclination appears with regard to the microorganisms causing diseases in fish, too. The anti-microbial activity of the nitrofuran [I] is, however, peculiarly and exceptionally high even in vivo.

Some of the tests, from which the results supports the above findings are set forth below.

(1) EFFECT ON *Aeromonas liquefaciens* IN VITRO AND IN VIVO

Test methods (a) In vitro test: The minimal inhibitory concentration (hereinafter referred to as "MIC") of the test compound was determined by the serial dilution method of *Aeromonas liquefaciens* isolated from eel and incubated in neutral boullion at 30° C. for 48 hours. The lowest concentration at which the visible growth of the organism was inhibited was considered as MIC.

(b) In vivo test: Goldfish (Wakin, *Carassius auratus*) weighing 7 to 8 g. were infected intramusuclarly with 0.06 ml. of cultured broth (30° C., 24 hours) of *Aeromonas liquefaciens* under ether anesthesia. This infection was lethal to the fish within 2 days. After infection, the fish were immersed in fresh water (20° C.) containing the test compound for 5 minutes and transferred into fresh water without the test compound. Then, the mortality was observed for the following 5 days.

Results

The results are shown in Table 1.

TABLE 1

| Test compound | In vitro MIC (mcg./ml.) | In vivo 50% effective concentration (mcg./ml.) |
|---|---|---|
| Furazolidone | 0.3 | >100 |
| Chloramphenicol | 1 | >100 |
| Tetracycline | 10 | >100 |
| Sulfisoxazole | 3 | >100 |
| 2-[2-(5-nitro-2-furyl)vinyl]-4-methylthiazole N-oxide | 0.03 | >10 |
| 4-[2-(5-nitro-2-furyl)vinyl]-pyrimidine | 0.1 | >10 |
| 4-[2-(5-nitro-2-furyl)vinyl]-6-hydroxymethylpyrimidine | 0.03 | >10 |
| 2-amino-4-[2-(5-nitro-2-furyl)vinyl]pyrimidine | 0.1 | 10 |
| 2-[2-(5-nitro-2-furyl)vinyl-3-methyl-pyrimidine | 0.3 | >10 |
| Nitrofuran [I] | 0.3 | 3 |

From the above table, it is seen that the in vivo activity is not parallel to the in vitro activity. It is also seen that the active compounds for the infections in terrestrial mammals are not necessarily effective in the in vivo control of pathogenic microorganisms for fish. The high activity of the nitrofuran [I] in vivo is conspicuous.

(2) EFFECT ON VARIOUS PATHOGENIC MICROORGANISMS OF FISH IN VITRO

Test method

The MIC of the test compound was determined by the serial dilution method on various pathogenic microorganisms incubated as follows: *Vibrio parahaemolyticus*, *Vibrio alginolyticus* and *Vibrio anguillarum*, at 30° C. for 48 hours in neutral boullion containing 3% sodium chloride; *Aeromonas liquefaciens* and *Aeromonas salmonicida*, at 30° C. for 48 hours in neutral bouillon; *Chondrococcus columnaris*, at 30° C. for 72 hours in tryptone-yeast extract medium; *Saprolegnia parasitica*, at 15° C. for 1 week in glucose Sabouraud.

Results

The results are shown in Table 2.

TABLE 2

| | MIC (mcg./ml.) | | |
|---|---|---|---|
| Test organism | Nitrofuran [I] | Furazolidone | Tetracycline |
| V. parahaemolyticus | 0.3 | 3 | 10 |
| V. alginolyticus | 1 | 3 | 10 |
| V. anguillarum | 0.1 | 1 | 3 |
| A. liquefaciens | 0.3 | 0.3 | 10 |
| A. salmonicida | 0.1 | 3 | 3 |
| C. columnaris | 0.01 | 1 | 0.3 |
| S. parasitica | 10 | >100 | >100 |

From the above table, it is clear that the in vitro potency of the nitrofuran [I] is 10 to 30 times that of furazolidone and of tetracycline.

(3) EFFECT ON EXPERIMENTAL INFECTION WITH *Aeromonas Liquefaciens* IN GOLDFISH Test methods (a) Bathing (continuous): Goldfish weighing 7 to 8 g. were infected intramuscularly with 0.06 ml. of cultured broth (30° C., 24 hours) of *Aeromonas liquefacines* under ether anesthesia. The fish were grouped and each group was placed in fresh water (20° C.) containing graded concentrations of the test compound. Then, observation was made for 5 days. In the same manner, the control group was placed in fresh water without any test compound.

(b) Bathing (temporary): The test was carried out as in (a) but the group of the fish placed in fresh water containing the test compound was, after 5 minutes, transferred into fresh water without any test compound.

(c) Oral administration: Goldfish weighing 7 to 8 g. were given white fish meal containing 10% of the nitrofuran [I] at a daily dose of about 200 mg. per kg. of bodyweight for 3 days. Then, the fish were infected with *Aeromonas liquefaciens* as in (a). After the infection, the fish received white fish meal without the active ingredient and were observed for the following 5 days. The control group was given white fresh meal without the nitrofuran [I] before and after infection.

Results

The results in the tests (a), (b) and (c) are respectively shown in Tables 3, 4 and 5.

TABLE 3

| Test compound | Concentration (mcg./ml.) | Day after infection | | | | | |
|---|---|---|---|---|---|---|---|
| | | 0 | 1 | 2 | 3 | 4 | 5 |
| Nitrofuran [I] | 1 | *8 | 8 | 8 | 8 | 8 | 8 |
| | 0.3 | 8 | 8 | 8 | 8 | 8 | 8 |
| | 0.1 | 8 | 8 | 2 | 1 | 0 | |
| | 0.03 | 8 | 8 | 0 | | | |
| Furazolidone | 10 | 8 | 7 | 7 | 7 | 7 | 7 |
| | 3 | 8 | 7 | 2 | 0 | | |
| Tetracycline | 10 | 8 | 2 | 0 | | | |
| | 1 | 8 | 8 | 0 | | | |
| Sulfisoxazole | 100 | 8 | 8 | 6 | 3 | 1 | 0 |
| Non-treated | | 8 | 8 | 0 | | | |

*Survival number.

TABLE 4

| Test compound | Concentration (mcg./ml.) | Day after infection | | | | | |
|---|---|---|---|---|---|---|---|
| | | 0 | 1 | 2 | 3 | 4 | 5 |
| Nitrofuran [I] | 100 | *6 | 6 | 6 | 6 | 6 | 6 |
| | 30 | 6 | 6 | 6 | 6 | 6 | 6 |
| | 10 | 6 | 6 | 5 | 5 | 5 | 4 |
| | 3 | 6 | 3 | 1 | 1 | 1 | 1 |
| | 1 | 6 | 0 | | | | |
| Furazolidone | 100 | 6 | 4 | 2 | 1 | 1 | 1 |
| | 30 | 6 | 1 | 0 | | | |
| Tetracycline | 100 | 6 | 1 | 0 | | | |
| Sulfisoxazole | 100 | 6 | 5 | 0 | | | |
| Non-treated | | 6 | 2 | 1 | 1 | 0 | |

*Survival number.

TABLE 5

| Group | Day after infection | | | | | |
|---|---|---|---|---|---|---|
| | 0 | 1 | 2 | 3 | 4 | 5 |
| Orally treated | *10 | 10 | 10 | 5 | 4 | 4 |
| Non-treated | 10 | 10 | 10 | | | |

*Survival number.

These tables reveal that the nitrofuran [I] is much more effective in the therapy of goldfish infected with *Aeromonas liquefaciens* than known chemotherapeutic agents, i.e. furazolidone, tetracycline and sulfisoxazole, and has also a prophylactic effect for such infection.

(4) EFFECT ON EXPERIMENTAL INFECTION WITH *Aeromonas Liquefaciens* IN EELS

Test method (a) Bathing (continuous): Eels (*Anguilla japonica*) weighing 25 to 30 g. were infected intramuscularly with 0.06 ml. of cultured broth (30° C., 24 hours) of *Aeromonas liquefaciens* under ether anesthesia. The fish were grouped and each group was placed in fresh water (20° C.) containing graded concentrations of the test compound. Then, observation was made for 5 days. The control group was placed in fresh water without any compound.

(b) Bathing (temporary): The test was carried out as in (a) but the group of fish placed in fresh water containing the test compound was, after 5 minutes, transferred into fresh water without any test compound.

(c) Oral administration: Eels weighing 25 to 30 g. were infected with *Aeromonas liquefaciens* as in (a) and then given the nitrofuran [I] orally once a day for 2 days, the first administration being made immediately after infection.

Results

The results in the tests (a), (b) and (c) are respectively shown in Tables 6, 7 and 8.

TABLE 6

| Test compound | Concentration (mcg./ml.) | Day after infection | | | | | |
|---|---|---|---|---|---|---|---|
| | | 0 | 1 | 2 | 3 | 4 | 5 |
| Nitrofuran [I] | 1.0 | *6 | 6 | 6 | 6 | 6 | 6 |
| | 0.3 | 6 | 6 | 6 | 6 | 6 | 6 |
| | 0.1 | 6 | 6 | 1 | 0 | | |
| Furazolidone | 100 | 6 | 4 | 1 | 0 | | |
| | 10 | 6 | 6 | 0 | | | |
| Tetracycline | 100 | 6 | 4 | 1 | 0 | | |
| | 10 | 6 | 6 | 2 | 0 | | |
| Sulfisoxazole | 100 | 6 | 3 | 0 | | | |
| Non-treated | | 6 | 1 | 0 | | | |

*Survival number.

TABLE 7

| Test compound | Concentration (mcg./ml.) | Day after infection | | | | | |
|---|---|---|---|---|---|---|---|
| | | 0 | 1 | 2 | 3 | 4 | 5 |
| Nitrofuran [I] | 30 | *6 | 6 | 6 | 6 | 6 | 6 |
| | 10 | 6 | 6 | 6 | 6 | 6 | 6 |
| | 3 | 6 | 6 | 4 | 4 | 4 | 4 |
| | 1 | 6 | 6 | 0 | | | |
| Furazolidone | 100 | 6 | 6 | 0 | | | |
| Tetracycline | 100 | 6 | 6 | 0 | | | |
| Sulfisoxazole | 100 | 6 | 6 | 0 | | | |
| Non-treated | | 6 | 6 | 0 | | | |

*Survival number.

TABLE 8

| Dose (mg./kg./day) | Day after infection | | | | | |
|---|---|---|---|---|---|---|
| | 0 | 1 | 2 | 3 | 4 | 5 |
| 100 | *5 | 5 | 5 | 5 | 5 | 5 |
| 50 | 5 | 5 | 4 | 3 | 3 | .3 |
| 25 | 5 | 2 | 2 | 1 | 0 | |
| Non-treated | 5 | 5 | 0 | | | |

*Survival number.

From the above tables, it is apparent that the nitrofuran [I] is much more effective against the infection with *Aeromonas liquefaciens* in eels than known chemotherapeutic agents, i.e. furazolidone, tetracycline and sulfisoxazole.

(5) TOXICITY IN FISH (a) Bathing (continuous): Groups of goldfish weighing 7 to 8 g. and eels weighing 25 to 30 g., each group consisting of 10 fish, were placed in fresh water containing a variety of concentrations of the nitrofuran [I] while aeration for 4 days, during which observation was made. As shown in Table 9, the $LC_{50}$ (lethal concentration 50) values of the nitrofuran [I] for the eel and the goldfish were 7.9 and 4.6 mcg. per ml., respectively.

TABLE 9

| Fish | Temperature of bathing, °C. | Day after bathing | | | |
|---|---|---|---|---|---|
| | | 1 | 2 | 3 | 4 |
| Goldfish | 20 | *5.6 | 5.6 | 5.6 | 4.6 |
| Eel | 15 | 17.8 | 11.2 | 7.9 | 7.9 |

*LC$_{50}$: mcg./ml.

(b) Bathing (temporary): Groups of fish as in (a) were immersed in 30 mcg. per ml. of the nitrofuran [I] for 30 minutes. All fish survived and no abnormality was found.

(c) Oral administration: A suspension of the nitrofuran [I] in 3% gum arabic was given orally to eels and observation was made for 5 days. As shown in Table 10, the LD$_{50}$ (lethal dose 50) value was 1780 mg. per kg. of bodyweight.

TABLE 10

| Dose (mg./kg.) | Change of body colour | Abnormal movement | Mortality |
|---|---|---|---|
| 2,000 | 0/6 | 4/6 | 4/6 |
| 1,000 | 0/6 | 0/6 | 0/6 |
| 500 | 0/6 | 0/6 | 0/6 |

Separately, a fish meal containing 10% of the nitrofuran [I], which was approximately 200 mg. per kg. of bodyweight per day, was given to ten goldfish. All fish survived.

(6) TOXICITY IN MICE

In acute toxicity test, each group of ten mice weighing 22 to 25 g. was given a suspension of the nitrofuran [I] in 3% gum arabic solution, and observation was made for 7 days. When administered at a dose of 2,000 mg. per kg. of bodyweight by both oral and intraperitoneal routes, all mice survived as shown in Table 11.

TABLE 11

Route: LD$_{50}$ (mg./kg.)
ip ———————————————————— >2000
po ———————————————————— >2000

In subacute toxicity test, three groups of ten male mice weighing 14 to 15 g. were given the nitrofuran [I] in oral doses of 50, 100 and 200 mg. per kg. of bodyweight for one month. The control group received a corresponding volume of 3% gum arabic soluotion. As shown in Table 12, no significant difference in weight gain between all test groups and the control group was observed. At the terminal of the test, numbers of erythrocyte and leucocyte, amounts of hemoglobin, hematocrit values and rates of reticulocyte of the groups administered the nitrofuran [I] were in normal range, compared with those of the control group. Any pathologic change which could be attributed to the medication of the nitrofuran [I] was not observed microscopically in liver, kidney, heart, lung, stomach, intestines and testicle.

TABLE 12

Mouse: male 14 to 15 g.
Dose: 200, 100 and 50 mg./kg./day.
Term: 4 weeks
Body weight: All animals treated showed normal weight gain
Blood examination, normal range:
    Hematocrit
    Hemaglobin
    Number of erythrocyte
    Number of leucocyte
    Rate of reticulocyte
Historical examination: No pathological changes were observed in liver, kidney, spleen, lung, heart, stomach, intestines and testicle A basic object of the present invention is to embody the use of the nitrofuran [I] as a prophylactic and therapeutic agent against fish diseases. Another object of this invention is to embody a prophylactic and therapeutic agent exerting an unerring and marked effect on microbial infections in fish with no material toxicity. Another object of the invention is to embody a composition for prophylaxis and therapy of infectious diseases of fish. A further object of the invention is to embody a method for preventing and treating infectious diseases of fish. These and other objects will be apparent to those conversant with the art to which the present invention pertains from the foregoing and subsequent descriptions.

The nitrofuran [I] used as the active ingredient in the present invention is known [British Pat. 1,053,730].

The anti-microbial activity of the nitrofuran [I] is seen on various bacteria, fungi and protozoa pathogenic to fish, of which examples are as follows: Vibrio, Aeromonas, Chondrococcus, Saprolegnia, Plistophora, Octomitus, etc.

According to the present invention, the nitrofuran [I] is applied to the fish to prevent, or hasten the recovery from microbial infections.

The fish so treated may be indigenous to fresh-water, brackish-water or salt-water. Specific examples are as follows: yellow tail, saurel, trout, flatfish, sillago, sea bream, codfish, horse mackerel, bonito, tunny, gray mullet, salmon, rainbow trout, shrimp, prawn, sea eel, eel, mud fish, carp, silver carp, dace, ayu, angel fish, guppy, platy fish, gold fish, ear-shell, top-shell, oyster, pearl oyster, etc.

On application, the nitrofuran [I] is ordinarily used as such. But, it may be sometimes employed in admixture for convenience in unskillful application such as home application. In such cases, the nitrofuran [I] may be extended with suitable solid or liquid diluents. Examples of these diluents are water, methanol, ethanol, starch, talc, bentonite, fish meal, sucrose, etc. If necessary, there may be further incorporated other chemotherapeutic agents, nitritional materials, disintegrating agents and the like. The content of the nitrofuran [I] in admixture is not limitative but may be practically from 0.001 to 50% by weight.

The application may be executed in various modes. One of the typical modes is to treat temporarily fish with an aqueous solution of the nitrofuran [I] by washing or immersng. Another typical mode is to cultivate fish in an appropriate medium (e.g. fresh water, brackish water, sea water) containing the nitrofuran [I]. Another typical mode is to administer the nitrofuran [I] orally to fish. A further typical mode is to give a fish meal admixed with the nitrofuran [I] to fish.

The amount of the nitrofuran [I] to be applied is associated with numerous factors such as the species, size and age of fish, the kind and symptom of infection, the circumstances surrounding fish, the application mode and the like. Thus, it can not be ruled generally and should be appropriately determined in each case. For instance, the dose of the active ingredient in oral administration is normally from 0.05 to 500 mg. per kg. of bodyweight. Further, for instance, the concentration of the active ingredient in temporary bathing may be from 0.1 to 100 p.p.m. Furthermore, for instance, the concentration of the active ingredient in bathing for a long duration (i.e. cultivation in an aqueous solution of the active ingredient) may be from 0.05 to 50 p.p.m.

As illustrated above, the nitrofuran [I] surely exerts a high anti-microbial activity against various microorganisms pathogenic to fish without showing any material toxicity not only in fish but also in mammals. Accordingly, the present invention can be advantageously adopted in fisheries, particularly in fish cultivation. For instance, a culture fish such as yellow tail, saurel, trout, carp, ayu, eel, gold fish or ear-shell is treated temporarily with an aqueous solution of the nitrofuran [I], cultivated in a medium containing the active ingredient or given a fish meal admixed with the active ingredient so that the occurrence of infectious diseases is blocked.

Practical and presently-preferred embodiments of the present invention are illustratively shown in the following examples, which should not be construed as a limitation of the scope of the invention.

EXAMPLE 1

Young saurels are weak in skin and, on transportation, usually injured sufficiently to result in 30 to 40% death. When the fish are immersed in sea water containing the nitrofuran [I] in 10 p.p.m. for several minutes prior to transportation and administered orally the nitrofuran [I] extended with fish meal at a daily dose of 0.01 g. per kg. of bodyweight for 3 consecutive days during transportation, there are no deaths.

EXAMPLE 2

For exterminating parasites in cultivated yellow tail, the fish are immersed into a 10 p.p.m. solution of the nitrofuran [I] in fresh water or a 20 p.p.m. solution of the nitrofuran [I] in 9% sodium chloride water for 3 to 6 minutes. Neither inflammation on the skin nor occurence of any infectious diseases is observed.

EXAMPLE 3

Water fungi cultured on Sabouraud's agar are mashed aseptically in a motar and added to a 10 l. volume tank filled up with distilled water. Aeration is effected. Into the tank, there are added killifish injured on the body surface, and the water temperature is maintained at 16° C. The water fungi grow on the body surface after 2 to 3 days and lead 100% death within 6 or 7 days. When the nitrofuran [I] is previously added to distilled water to make 3.3 p.p.m., the growth of the water fungi is inhibited and the death of the fish is prevented.

EXAMPLE 4

Spawns of goldfish infected with water fungi give an inferior hatching rate. When the spawns are immersed in a 3 p.p.m. solution of the nitrofuran [I] in fresh water for 5 minutes instantly after laid from the infected parent fish, the hatching rate is much improved.

EXAMPLE 5

Young trout of less than 10 cm. in length, confirmed to be infected with Octomitus, are orally administered the nitrofuran [I] at a dose of 0.1 to 1 mg. per kg. of bodyweight twice with an interval of 3 days. The number of the Octomitus in digestive organs is markedly lessened and 70% of the fish survive. Non-medicated fish are all dead within 7 days.

EXAMPLE 6

Eels infected with Plistophora and bearing ulcers are placed in a 1 p.p.m. solution of the nitrofuran [I] at 18 to 21° C. for 10 consecutive days. By such treatment, the ulcers disappear and their lives are prolonged.

EXAMPLE 7

Ear-shells wounded purulently when being carried are subjected to daily immersion in sea water containing 10 to 30 mg. of the nitrofuran [I] per liter for 5 minutes for a period of 7 days and the ear-shells survive. When non-medicated, the ear-shells are dead within 7 days.

EXAMPLE 8

| | Grams |
|---|---|
| Nitrofuran [I] | 10 |
| Starch | 90 |
| Talc | 400 |

The above materials are mixed together, granulated and tableted in a conventional manner to give 1,000 tablets, each weighing 500 mg. One tablet containing 10 mg. of the active ingredient is dissolved in 50 liters of fresh water, and goldfish are kept therein.

What is claimed is:

1. A fish treating and immersing composition for combatting infectious diseases of fish caused by bacteria, protozoa or fungi consisting essentially of 0.3 to 100 p.p.m. of 2-[2-(5-nitro-2-furyl)-vinyl]-6-hydroxymethylpyridine in water.

2. The solution of claim 1 wherein the concentration is from 0.3 to 50 p.p.m.

3. A method for controlling bacteria-, fungi- or protozoa-caused infectious disease in fish which comprises contacting said fish with an amount of 2-[2-(5-nitro-2-furyl)-vinyl]-6-hydroxymethylpyridine effective to prevent or control said infectious disease.

4. The method of claim 1 wherein the disease are of bacterial infection.

5. The method of claim 1, wherein the diseases are of protozoal infection.

6. The method of claim 3 wherein the fish are treated by immersion in water containing said compound for a short but sufficient time for said effective amount to make said contact and then placed in water free of said compound.

7. The method of claim 3 wherein the fish is cultivated in water containing said compound.

8. The method of claim 3 wherein said fish are fed said effective amount.

9. The method of claim 8 wherein the fish is fed fish meal containing said effective amount.

References Cited

UNITED STATES PATENTS 3,352,683   11/1967   Schmidt et al. _____ 424—263

FOREIGN PATENTS 1,053,730   1/1967   Great Britain _____ 260—240A

OTHER REFERENCES

The Merck Veterinary Manual, pp. 1252–53 and 1561 (1967).

Chem. Abstracts, vol. 63 (17048 c) (1965).

N.N.D. (New and Nonofficial Drugs), pp. 100–01 (1964).

SAM ROSEN, Primary Examiner